United States Patent [19]

Burnett et al.

[11] 4,230,231

[45] Oct. 28, 1980

[54] CLOSURE CAP

[75] Inventors: Robert R. Burnett, Sunrise; John W. Box, Miami, both of Fla.

[73] Assignee: Coulter Electronics, Inc., Hialeah, Fla.

[21] Appl. No.: 30,158

[22] Filed: Apr. 16, 1979

Related U.S. Application Data

[63] Continuation-in-part of Ser. No. 930,157, Aug. 1, 1978.

[51] Int. Cl.³ .................................... B65D 39/08
[52] U.S. Cl. .................................... 215/329; 215/277; 215/307; 215/354; 53/489
[58] Field of Search ............... 215/277, 307, 329, 354, 215/341; 53/489, 490

[56] References Cited

U.S. PATENT DOCUMENTS

| | | | |
|---|---|---|---|
| 456,480 | 7/1891 | Cziner | 215/354 X |
| 807,381 | 12/1905 | Hicks | 215/354 |
| 1,898,342 | 2/1933 | Cuthbert | 215/329 |
| 2,659,510 | 11/1953 | Jung | 215/329 |
| 2,927,709 | 3/1960 | Hoffman | 215/307 X |
| 3,712,498 | 1/1973 | Lawrence | 215/277 X |

*Primary Examiner*—Donald F. Norton
*Attorney, Agent, or Firm*—Charles H. Brown

[57] ABSTRACT

A reusable closure cap for sealing a vial, comprising a rigid tubular screw-type cover having as an integral part thereof a relatively soft highly elastic stopper bonded to the interior of the closed end of the tubular cover. The elastic rubber stopper has a centrally positioned hollow interior portion coaxially with and facing the open end of the vial to be sealed.

10 Claims, 10 Drawing Figures

CLOSURE CAP

This application is a continuation-in-part of our patent application Ser. No. 930,157 filed Aug. 1, 1978, entitled "Closure Cap".

This inventin is concerned with closure caps for use on vials in the medical and biochemical art fields.

An important requirement in the use of such caps is that they be capable of tightly sealing the vials from bacteria and other contaminants which may enter the vial from the external environment, and that they be reusable until the contents of the vial are entirely depleted.

BACKGROUND

Known types of vial closure caps suffer from problems. One such known closure cap makes use of a rubber plug stopper which after insertion into the open end of the vial has its upper portion completely covered and surrounded by a thin aluminum sheath. The top of the aluminum sheath and a small portion of the surrounding aluminum skirt are scored to enable the insertion of a fingernail to thereby tear the thin aluminum sheath and remove it from the rubber stopper. In practice, the aluminum sheath does not always completely separate from the rubber stopper and the technician often suffers finger cuts from the sharp edges of the aluminum residue which surrounds the stopper. Other problems with this particular type of closure cap are: the fingernail inserted into the scored portion of the aluminum sheath may break, and the removal of the rubber plug stopper sometimes causes the liquid contents (often a blood solution) of the vial to splash onto the person opening the vial.

Another known closure cap is described in U.S. Pat. No. 3,540,612 granted to William T. Brady, Nov. 17, 1970. This patent discloses a closure cap having a frustoconical section connected to a closed end plug section to form a one-piece cap. The plug section has a bead thereon removed from the distal end thereof. All parts of this particular cap are made of the same deformable material which material bulges when the cap is tightened on the vial. Although the patent falls to describe the particular material from which the entire cap is made, it is quite clear that it is a plastic, such as a copolymer, which deforms partially plastically and partially elastically, as evidenced by the commercially available bottle caps incorporating the patented invention. Disadvantages of this known cap are: The torque required to open and close the bottle cap during repeated uses of the cap tends to cause the deformable plastic material to retain the shape into which it has been deformed once it has been initially used, thereby interfering with a perfect seal upon re-use of the cap. Since the screw-type cover part and the closed end plug of the one-piece cap are made of the same deformable material, the screw threads of the cover tend to deform permanently upon repeated threading and rethreading of the cap on the bottle until finally tightening of the cap on the bottle does not produce sufficient downward pressure to assure a proper air and liquid-tight seal with the bottle. The space between the bead and the bottom of the plug constitutes a blood catching intersection area which promotes clotting and coagulation of the blood, thereby interfering with accurate repeatable instrument counter readings and measurements of the blood solution until the vial contents are entirely depleted.

SUMMARY OF THE INVENTION

The closure cap of the present invention overcomes the aforesaid disadvantages of the known vial caps. Broadly stated, the cap of the invention is a rigid screw-type tubular cover permanently bonded in its interior as a single integral unit to a relatively soft highly elastic elastomer material which serves as a plug-type stopper. The term "elastomer" used herin is a material which at room temperature stretches under low stress to at least twice its length and snaps back to its original length upon release of the stress. This term is deemed to include natural and synthetic rubber or any "rubber like" material such as soft flexible plastics which are highly elastic and capable of rapid elastic recovery upon the release of stress or pressure. The cap, in one embodiment of the invention, satisfies the important requirement that there must be precision and accuracy of measurements during repeated uses of a vial containing a blood solution until the entire contents are used up. The blood solution in the vial must be free of contaminants at all times. To assure this desideratum, the closure cap of the invention always provides an effective air and liquid-tight seal with the vial between repeated usages of the vial, and is so constructed and arranged that there exists a smooth flow of blood solution over the interior of the vial during a rocking motion of the vial without causing clotting or coagulation of the blood on the interior of the cap. The relative ease in removing the cap from the vial and re-sealing the vial without causing splashing of the liquid contents or deterioration in the sealing performance of the cap is an additional advantage of the invention.

The rocking motion referred to above is a mixing action to assure homogeneity of the blood solution in the vial before it is used each time. Tiny glass beads or ball bearings may be introduced into the vial to promote mixing of the blood solution during the rocking motion.

An embodiment of the closure cap of the present invention for use with a vial having a liquid solution (for example, blood) comprises a rigid tubular cover of plastic material closed at one end and threaded in its interior in the manner of a screw-top cover for registration with the threads on the exterior of the vial. A highly elastic stopper is bonded to the interior of the closed end of the rigid threaded tubular cover by a pressure sensitive, strong-bonding, fast-acting adhesive so that the cover and stopper form an integral unit. The highly elastic elastomer stopper is designed to enter the open end of the vial to provide an air and liquid-tight seal with the walls of the vial. The stopper is arranged coaxially with the center of the rigid cover and has a tapered portion with a rounded edge to enable effective insertion into the open end of the vial in response to a downward pressure thereon resulting from tightening of the cap on the vial. This downward pressure is achieved by turning or twisting the cap onto the open end of the vial so that the threads in the cover engage the threads on the vial to the fullest extent. The bottom of the stopper is concave to enable the blood solution contents of the vial to flow smoothly thereover and back into the vial during the rocking motion of the vial. The smooth concave surface prevents the blood solution from collecting at points of contact between stopper and vial and causing undesired clotting or coagulation of the blood. Stated another way, the stopper of the invention is designed to minimize or eliminate entirely blood retaining (catching) intersection areas.

An important characteristic of the relatively soft elastic stopper used in the closure cap of the present invention is its ability always to retain its original shape despite repeated useage of the closure cap. This stopper will become deformed when pressure or force is applied to it and then snap back rapidly to its original shape when the pressure or force is removed, in the manner characteristic of the quality of a rubber band which has not been stretched beyond its elastic limit.

A preferred form of the relatively soft highly elastic stopper used in the practice of the present invention is one which has an endless groove in the top thereof to allow any undesired excess of glue or adhesive applied during the bonding process of rigid screw-type cover and elastic stopper to flow into the groove, thereby preventing the glue or adhesive from running over the top of the stopper and into the thread area between the closure cap and the bottle over which the closure cap is placed. Although the endless groove is preferred, it may be replaced by a series of groove-like indentations around the top of the stopper without departing from the spirit and scope of the teachings of the purpose of the groove.

The closure cap of this embodiment of the invention has been satisfactorily used with a "Coulter Hematology Reference Control" constituting a vial containing a blood solution for monitoring the precision and accuracy of the "Coulter Counter" measurements or determinations of the following: White Cell Counts, Red Cell Counts, Hemoglobin, Mean Corpuscular Volume, Hermatocrit, Mean Corpuscular Hemoglobin, and Mean Corpuscular Hemoglobin Concentrations. The control (vial contents) is prepared from human blood to which are added fixed erythrocytes to stimulate leukocycles. One such control is commercially sold under the registered trademark 4C by Coulter Electronics, Inc., of Hialeah, Florida.

Another closure cap embodiment of the invention is designed for use with a vial the contents of which are to be subjected to a freeze-dry operation. Here again, there is provided a relatively soft highly elastic stopper of rubber or a flexible plastic of "rubber like" consistency which is bonded at its top by relatively fast-acting, pressure-sensitive, strong-bonding material to the interior of a screw top cover made of rigid plastic material. The stopper of this embodiment has a tapered portion consisting of a plurality of equal-length spaced segments surrounding a hollow interior. The segments are arcuate in shape. Each segment is separated from its adjacent segment by a slot which is in fluid-free communication with the hollow interior, and is provided with a pair of spaced rubber ridges along its length. The ridges on all segments lie on concentric circles. The continuity of each circle of ridges is interrupted by the aforesaid slots. The purpose of the ridges is to enable the stopper to seat itself partially into the vial during a freeze-dry operation on the vial contents, before the vial contents are completely freeze-dried and before the highly elastic stopper is pushed further into the vial to provide an air-tight seal and then subsequently bonded to the screw top cover. Here again, the stopper is made of highly elastic rubber or "rubber like" plastic material as is the stopper of FIGS. 1, 2 and 3. A more detailed description of this operation appears hereinafter.

BRIEF DESCRIPTION OF THE DRAWINGS

Throughout the figures of the drawing the same parts are designated by the same reference numerals, and equivalent parts by prime designations.

Figure 1:
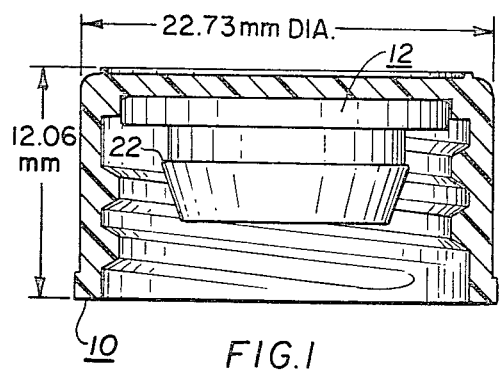
FIG. 1 is a vertical section through the closure cap of one embodiment of the invention, showing the relatively soft highly elastic stopper within and secured to the surrounding rigid cover as an integral unit therewith.

The parts shown in the different views of the drawing are exaggerated in size in the interest of clarity and do not accurately represent the true dimensions of the commercial embodiments. The numerical dimensions given in FIGS. 1, 2, 3 and 6 are accurately representative of the closure caps of the invention successfully constructed and satisfactorily tried out in practice.

DETAILED DESCRIPTION FIGS. 1 TO 5

The closure cap embodiment of the invention shown in FIGS. 1 to 5 inclusive comprises a rigid plastic cover 10 of the screw top type made from a plastic material (for example, phenol) to the interior of which there is securely fastened a highly elastic stopper 12. Both rigid cover 10 and elastic stopper 12 form a single integral unit inseparably bonded together by a pressure sensitive, strong-bonding, fast-acting, adhesive or glue 14. The adhesive 14 may be ethyl cyanocrylate. One example of such strong bonding glue is commercially sold under the trademark "SUPER GLUE" and is distributed by Loctite Corp. of Newington, Connecticut.

The rigid cover 10 is tubular in configuration with a smooth flat top and helically wound interior threads, as shown, adapted to engage the threads on the top portion of the vial 16. Vial 16 is typical of any small bottle having a uniformly dimensioned opening in a reduced neck portion threaded exteriorly to accept the threads on the cover 10 when the cap is tightened on the vial by a twisting motion. The exterior circular surface of the rigid cover is preferably knurled or provided with numerous equally spaced serrations as shown, to enable easy grasping of the cover. The exterior top surface of the rigid cover need not be flat.

The highly elastic stopper 12 is relatively soft and made of an elastomer such as natural or synthetic type rubber or a combination of natural and synthetic type rubber, or a "rubber like" highly elastic soft flexible plastic such as polyvinyl chloride (PVC) or polyethylene-ethylene vinyl acetate copolymers. The material from which the stopper is made must be highly elastic, able to stretch under low stress and snap back to its original shape upon release of stress. The PVC may be treated with an additive to provide the desired elastic properties. The synthetic type rubber may, for example, be neoprene or silicon rubber. The highly elastic stopper has a smooth flat top area which has such lateral dimension that it extends beyond the open end of the vial, as shown. The glue 14 is applied to this flat top area for attaching the stopper to the interior of the rigid cover 10, as explained in more detail hereinafter. Stopper 12 is fluid impermeable and is substantially devoid of any relatively hard or stiff plastic material and has such high elasticity that it always returns very rapidly to its original size and shape shown in FIGS. 1 to 5 after repeated flexing and stretching during usages of the cover cap of the invention. The central portion of the stopper 12 facing the open end of the vial is provided with a smooth concave hollow area 18 to enable the liquid solution (such as blood) in the vial to flow thereover during agitation of the contents of the vial without collecting any part of the solution on its surface. The smoothly rounded ends 20 of the concave hollow area 18 promote the mixing action of the blood and aid in minimizing or eliminating entirely blood retaining (catching) inter-section areas. The tiny glass beads or ball bearings hereinbefore mentioned, contained in the vial, roll over the rounded ends 20 and into the concave interior 18 and then back into the vial as the vial is rocked.

Figure 2:
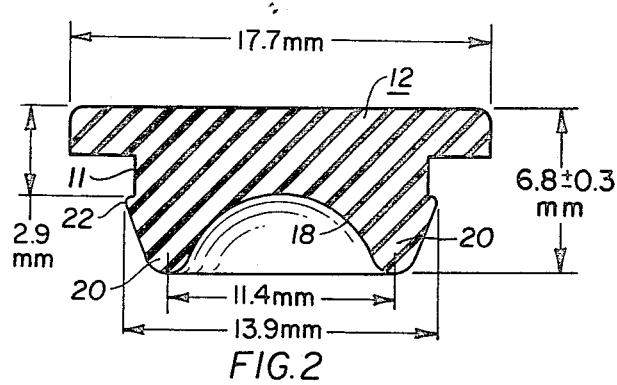
FIG. 2 is a vertical section through the highly elastic stopper of FIG. 1.
Figure 5:
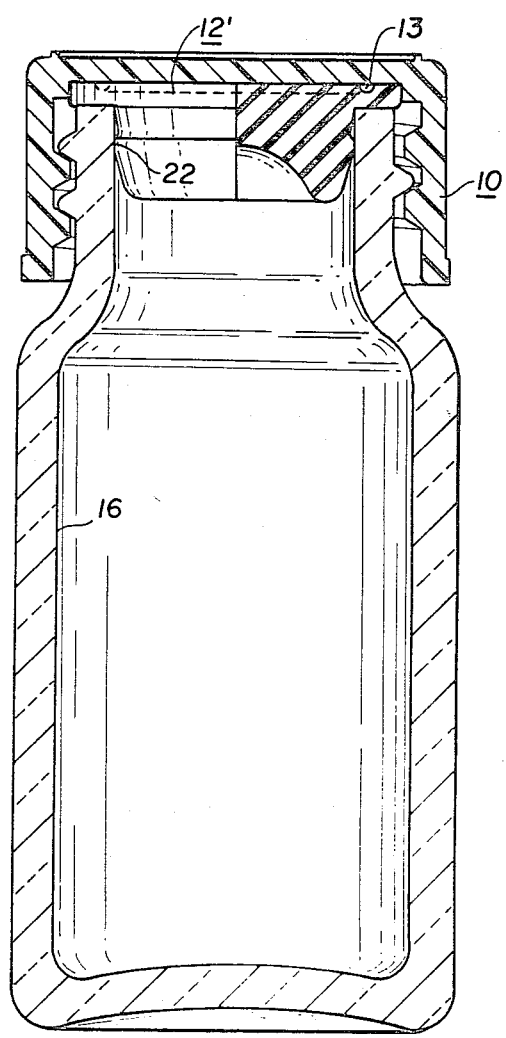
FIG. 5 is a vertical section of a screw-cap type vial showing the closure cap of the invention in air and liquid-tight sealing relation with the vial. The highly elastic stopper is shown partly in section and partly in perspective.
Figure 3:
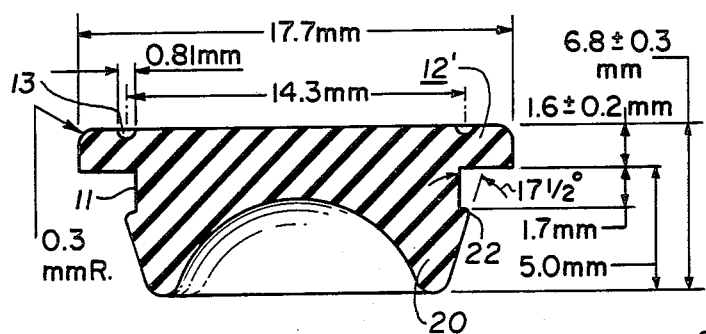
FIG. 3 is a preferred form of stopper and is a modification of the stopper of FIGS. 1 and 2 by including an endless circular groove in the top of the stopper.
Figure 8:
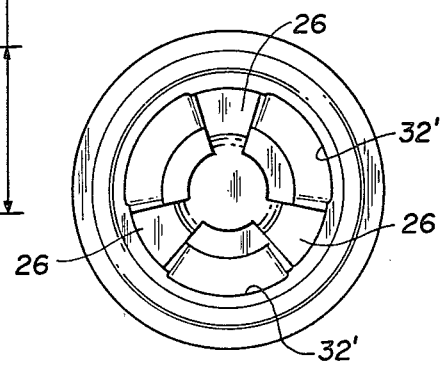
FIG. 8 is a bottom view of the stopper of FIGS. 6 and 7.
Figure 9:
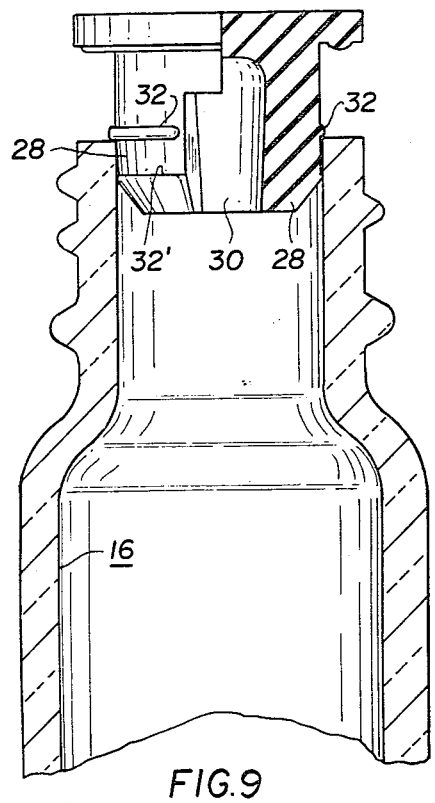
FIG. 9 is a view partly in section and partly in perspective of the closure cap of FIG. 6 inserted partially into the uniformly dimensioned opening or orifice in the neck of a screw-cap type of vial, in the position the cap occupies during the freeze-dry process.

A protruding circular lip or shoulder 22 of the stopper 12 has a lateral dimension which in the unflexed condition of the stopper is slightly larger than the lateral dimension of the open end of the vial. This lip 22 engages the interior of the neck of the vial 16 when the closure cap is screwed down on the vial, as shown in FIG. 5, and provides an air and liquid-tight seal. FIGS. 1, 2 and 3 illustrate how the lip extends outwardly when the closure cap is removed from the vial while FIG. 5 shows how the lip rib or bulge is flexed or squeezed against the interior of the neck of the vial when the closure cap is tightened down on the vial. The bottom portion of the stopper 12 between circular lip 22 and the rounded ends 20 is tapered to permit easy insertion of the stopper into the open end of the neck of the vial. An indented portion 11 between the circular lip 22 and the top portion of the stopper 12 provides space into which the lip can flex in the sealing position of FIG. 5. The top closed portion has a diameter which is larger than the cylindrically-shaped opening or orifice of the vial and acts as a flange when seated upon the vial opening. The surface of the stopper may be treated with liquid silicon to provide lubrication properties. This is done by placing numerous stoppers in a tumbling machine and introducing therein liquid silicon in the approximate ratio of a couple of ounces of silicon to one hundred thousand stoppers.

Figure 4:
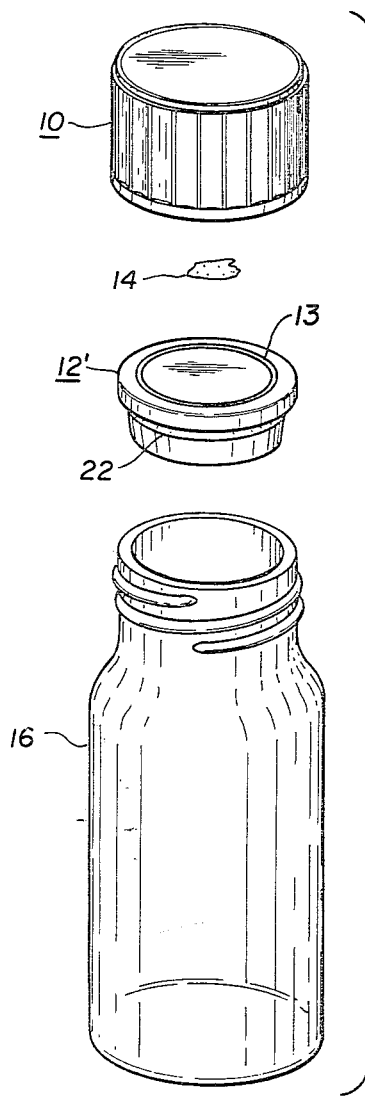
FIG. 4 is an exploded view in perspective of the various parts of the closure cap of FIG. 1, using the stopper of FIG. 3, in relation to a known screw-cap type of glass vial having a uniformly dimensioned cylindrical opening or orifice at one end with which the closure cap of the invention may be used.

The elastic stopper $12^1$ of FIGS. 3, 4 and 5 is provided with an endless groove, notch or cut 13 to allow any undesired excess of glue 14 applied during the bonding process of rigid screw-type cover and elastic stopper to flow into the groove, thereby preventing the glue from running over the top of the stopper and into the threaded area between the closure cap and the bottle over which the cap is placed. This groove is located between the marginal area of the stopper and the center thereof. It can be of any desired depth in the top of the stopper provided that the groove does not penetrate into the indent portion 11. FIG. 3 illustrates, by way of example only, the dimensions which the stopper and groove may take for a specific size of vial opening. The depth of the groove may be approximately 0.4 mm.

An important aspect of the closure cap of the invention is that a hard rigid material for the cover is used where it is needed, and a soft highly elastic material is used for the stopper where it is required for the sealing operation. The highly elastic stopper is characterized by its ability at room temperature to stretch under low stress to at least twice its length and snap back to its original length upon release of stress. Thus two different materials serving relatively different functions cooperatively combine to provide an improved closure cap, as distinguished from a closure cap made of identical materials for both cover and stopper.

OPERATIONAL SEQUENCE

In the manufacturing operation of producing the closure cap of FIGS. 1 to 5 inclusive, the highly elastic stoppers are sterilized in an autoclave before being moved into a glove box. The interior of the glove box is a sterile environment due to flow of sterile air therethrough. Hand manipulation in the sterile box is achieved by an operator with sterile gloves affixed to sealed openings in the box into which the operator inserts her hands. The sterile vials are moved in trays down the sterile box and the blood solutions inserted into the vials. The operator then selects a stopper, places it over the open neck of the vial and by a single downward motion of a finger tamps the stopper into the vial to produce an air and liquid-tight seal. At this point in the operation there is no need to hold the vial. The contents of the vial are, at this point, completely sealed from outside contamination. The sealed vials are then moved to a station outside the sterile box and a drop of pressure sensitive, strong-bonding, fast-acting glue or adhesive 14, such as ethyl cyanocrylate material, is placed on top of the rubber stopper 12. The glue drop may be approximately 100th of a ml ($\pm$ml/100). Excess glue will flow into groove 13 of the elastic stopper. The open end of the rigid plastic cover is then immediately placed over the stopper and screwed onto the threads on the vial to the fullest extent, thereby causing the smooth interior of the top portion of the rigid plastic cover to firmly engage the top of the rubber stopper. The pressure-sensitive, strong-bonding glue spreads and bonds the stopper and cover into a single integral closure cap unit such that unscrewing the rigid cover results in the removal of the highly elastic rubber stopper from the bial. The cover cap of the invention can now be used repeatedly to achieve firm air and liquid-tight sealing of the liquid contents of the vial merely by turning the rigid cover on the vial in the proper direction. The high elasticity of the stopper enables it always to retain its original size and shape and to perform its desired sealing function regardless of the number of repeated uses of the cover cap.

FIGS. 6 TO 10

Figure 6:
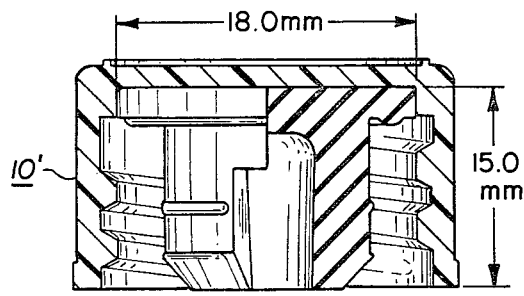
FIG. 6 is a vertical section through the closure cap of another embodiment of the invention, particularly designed to permit a freeze-dry process to be applied to the vial contents. The highly elastic stopper is shown partly in section and partly in perspective.
Figure 7:
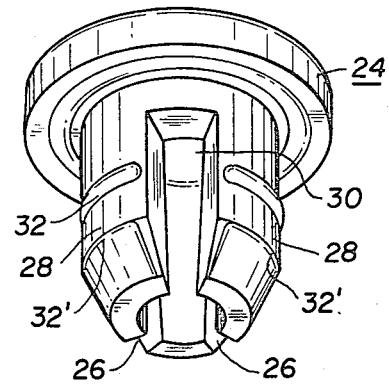
FIG. 7 is a perspective view of the highly elastic stopper of FIG. 6.

The closure cap of the embodiment of FIG. 6 differs from that of FIG. 1 primarily in the structure of the highly elastic stopper. Here again, as in FIG. 1, the stopper 24 is securely bonded by a drop of strong-bonding, fast-acting, pressure-sensitive glue to the interior top portion of the rigid plastic cover $10^1$ so that the rigid cover $10^1$ and the highly elastic stopper 24 form a single integral unit. Although not shown in FIGS. 6 to 10, the elastic stopper 24 may be provided with a circular groove in the top thereof in the manner shown in FIGS. 3, 4 and 5 to allow undesired excess glue to flow therein during the bonding process of screw-type cover and stopper.

The stopper 24 of FIGS. 6 to 10 is designed for use in a freeze-dry operation on the contents of vial 16. As shown most clearly in FIGS. 6 and 7, the stopper 24 has its lower part divided by three equally spaced slots 26 into three flexible equal-length segments 28. These segments 28 surround an interior hollow space 30 which is longer than the slots 26. Each segment 28 is provided with two spaced ridges 32 and $32^1$ of the same elastic material as the rest of the stopper. The lower portions of the segments 28 are tapered inwardly toward the center, as shown. The ridges 32 and $32^1$ form concentric circles which are interrupted by the easily spaced slots 26.

It should be noted from FIG. 6 that the open end of the tubular interiorly threaded rigid plastic cover $10^1$ is flush with the tapered tip of the highly elastic stopper 24, whereas in the embodiment of FIG. 1 the rigid plastic cover 10 extends beyond the bottom part of the stopper 12. Variations in length of the rigid plastic cover are permissible with due regard to the sealing functions to be achieved and the dimensions of the neck portion of the vial 16.

OPERATIONAL SEQUENCE

The operating steps which result in the freeze-dry process, the sealing of the vial, and the bonding of the highly elastic rubber stopper and the rigid plastic cover as a single integral will now be given.

The vial with its liquid contents appears before the operator in a clean but not necessarily a sterile environment. The operator inserts the stopper 24 partially into the neck of the vial 16 until the stopper rests on its lowermost ridge $32^1$. The vial along with many hundreds or thousands of similar vials, also provided with identical partially seated stoppers, is placed in the freeze-dry chamber in which the temperature and vacuum are controlled. Due to the partial seating of the rubber stopper 24 in the neck of the vial 16 there is fluid flow communication between the freeze-dry chamber and the interior of the vial through the slots 26 and the centrally positioned hollow space 30. The condition in the freeze-dry chamber reduces the frozen liquid contents of the vial to powder or granules. Observation of the condition of the vial contents can be made through windows in the freeze-dry chamber.

Figure 10:
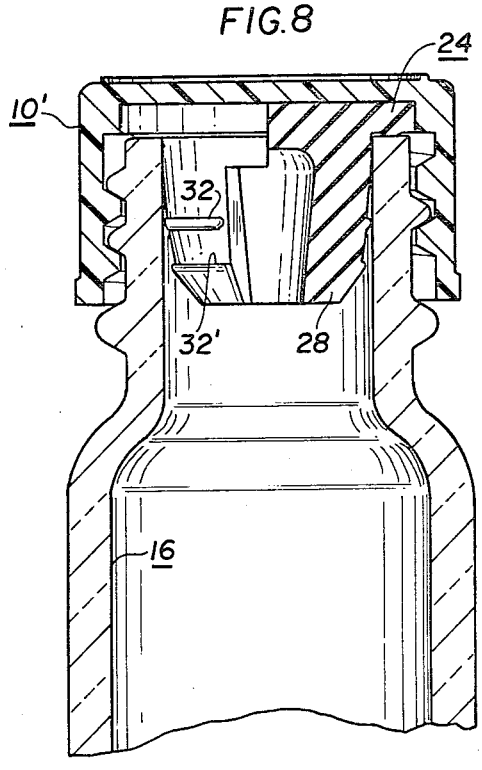
FIG. 10 shows the closure cap of the embodiment of FIGS. 6 and 9 tightly screwed to the top of the vial in air and liquid-tight sealing relation therewith.

After the freeze-dry operation is completed and while the stopper is partially in place a shelf or similar object within the freeze-dry chamber descends to fully and completely seat the highly elastic stoppers on the necks of the vials in the manner indicated by the position of the stopper in FIG. 10, to thereby tightly seal the powdered contents within the vial from the outside atmosphere. The elastic ridges 32 are squeezed against the interior neck part of the vial to aid in sealing the vial. The sealed vials with the stoppers in place are then removed from the drying chamber into a clean area. The operator now places a drop of pressure-sensitive, strong-bonding, fast-acting glue on the top of each stopper after which the rigid plastic screw-type cover is immediately placed over the stopper and tightened over the neck of the vial so as to bond the stopper to the interior top portion of the rigid cover as indicated in FIG. 10. This last step is similar to that hereinbefore described to form the bond between the rigid cover and the stopper of the embodiment of FIG. 1. The cover cap of FIG. 5, like that of FIG. 10, can be repeatedly used merely by turning the rigid cover which carries with it, as an integral unit thereof, the highly elastic sealing stopper.

In closure cap embodiments of the invention constructed and satisfactorily tested, the stopper was made of natural rubber which when subjected to three hundred percent (300%) of elongation indicated a stress reading of twelve hundred pounds per square inch (1200 psi). Although such a reading is preferred, the range of acceptable material for the highly elastic stopper may be from 300 psi up to 2500 psi. This range is not as great as it may seem, since it is not strictly linear and the higher numbers represent material that is harder to stretch as well as reflecting the fact that the material has a greater tenacity in retaining its original shape when subjected to stress as well as returning to its original shape when stress is removed. In contrast, normal plastics, such as the rigid cover of the closure cap of the invention, has a modulus of elasticity approximating 200,000 psi for the same degree of elongation.

SUMMATION

The closure cap of the invention is a combination of rigid screw-type plastic cover bonded in its interior to a relatively soft highly elastic stopper. The highly elastic stopper always retains its size and shape upon removal from the vial despite repeated uses of the cap and without diminution of its effective sealing properties. The closure cap is relatively easy to remove from the vial and to re-seal the vial without causing splashing of the vial contents.

There has been described a closure cap having a rigid cover of one kind of material and a highly elastic stopper of another kind of material both bonded together to form a single integral product. The rigid cover is used where it is needed and the highly elastic stopper where it is required for the sealing function. The two different materials though serving relatively different functions cooperatively combine to provide an improved closure cap.

What is claimed is:

1. For use in the medical and biochemical art field, a reusable and removable closure cap for sealing a vial which has a uniformly dimensioned cylindrical opening exteriorly threaded at one end, comprising as a single integral unit a rigid tubular cover of plastic material interiorly threaded for registering with the threads on said vial, said cover being closed at only one end, a plug-type stopper of highly elastic and relatively soft material having a flat top area and a coaxially positioned bottom tapered portion, that part of said stopper which is below said flat top area having an annular lip intermediate the ends thereof which has a lateral dimension larger than the diameter of said cylindrical opening, but smaller than the lateral dimension of said flat top area, said tapered portion being adapted to enter the open end of said vial and to provide with said lip a liquid and air-tight seal for the contents of said vial, and a pressure-sensitive material of strong-bonding adhesive qualities bonding the central top portion of said rigid tubular cover in its interior to the central flat top portion of said highly elastic stopper, said stopper being characterized by its ability at room temperature to stretch under low stress and to return rapidly to its original shape upon release of stress.

2. A closure cap as defined in claim 1 wherein said tapered portion has a centrally positioned hollow interior which is entirely open at its bottom to the interior of said vial when said cover with its integrally bonded stopper is seated in said vial, there being a circular indented portion in said elastic stopper located between said lip and the top flat area of said stopper.

3. For use in the medical and biochemical art field, a re-usable closure cap for sealing a vial which is exteriorly threaded at one end, comprising as a single integral unit a rigid tubular cover of plastic material interiorly threaded for registering with the threads on said vial, said cover being closed at only end, a plug type stopper of highly elastic and relatively soft material having a flat top area and a coaxially positioned bottom tapered portion, said tapered portion being adapted to enter the open end of said vial and provide a liquid and air-tight seal for the contents of said vial, and a pressure-sensitive material of strong adhesive qualities bonding the top of said rigid tubular cover in its interior to the flat top of said highly elastic stopper, said stopper being characterized by its ability at room temperature to stretch under low stress and to return rapidly to its original shape upon release of stress, the top of said highly elastic stopper being provided with a groove located near the peripheral bounds of said stopper.

4. For use in the medical and biochemical art field, a re-usable closure cap for sealing a vial which is exteriorly threaded at one end, comprising as a single integral unit a rigid tubular cover of plastic material interiorly threaded for registering with the threads on said vial, said cover being closed at only one end, a plug type stopper of highly elastic and relatively soft material having a flat top area and a coaxially positioned bottom tapered portion, said tapered portion being adapted to enter the open end of said vial and provide a liquid and air-tight seal for the contents of said vial, and a pressure-sensitive material of strong adhesive qualities bonding the top of said rigid tubular cover in its interior to the flat top of said highly elastic stopper, said stopper being characterized by its ability at room temperature to stretch under low stress and to return rapidly to its original shape upon release of stress, the top of said highly elastic stopper being provided with a groove located near the peripheral bounds of said stopper, said groove being endless and surrounding the central part of said flat top area.

5. For use in the medical and biochemical art field, a re-usable closure cap for sealing a vial which is exteriorly threaded at one end, comprising as a single integral unit a rigid tubular cover of plastic material interiorly threaded for registering with the threads on said vial, said cover being closed at only one end, a plug type stopper of highly elastic and relatively soft material having a flat top area and a coaxially positioned bottom tapered portion, said tapered portion being adapted to enter the open end of said vial and provide a liquid and air-tight seal for the contents of said vial, and a pressure-sensitive material of strong adhesive qualities bonding the top of said rigid tubular cover in its interior to the flat top of said highly elastic stopper, said stopper being characterized by its ability at room temperature to stretch under low stress and to return rapidly to its original shape upon release of stress, the top of said highly elastic stopper being provided with a groove located near the peripheral bounds of said stopper, said groove being circular.

6. A closure cap comprising a rigid cover bonded to the top of a highly elastic relatively soft plug-type stopper for sealing the contents of a bottle, the top of said stopper being closed and having a groove therein surrounding the central area of said top, said stopper being characterized by its ability at room temperature to stretch under low stress and to snap rapidly back to its original shape upon release of stress.

7. A reusable closure cap for sealing a vial having a cylindrical opening of uniform diameter which is exteriorly threaded at one end, comprising as a single integral unit a rigid tubular cover of one kind of material interiorly threaded for registering with the threads on said vial, and a plug-type stopper of a different kind of material which is highly elastic and has a closed end of such lateral dimension as to extend beyond and to rest upon the open end of said vial, and a lip intermediate the ends of said stopper having a lateral dimension in its unflexed condition, which is larger than the uniformly dimensioned diameter of the open end of the vial and also larger than other portions of said stopper below said closed end, said stopper being inseparably bonded by a pressure-sensitive bonding agent at the central portion of its closed end to the top of said rigid cover in its interior, said stopper serving to seal the contents of said vial and being characterized by its ability to stretch under relatively low stress and to snap rapidly back to its original shape upon release of stress.

8. For use in the medical and biochemical art field, a re-usable closure cap for sealing a vial which is exteriorly threaded at one end, comprising as a single integral unit a rigid tubular cover of plastic material interiorly threaded for registering with the threads on said vial, said cover being closed at only one end, a plug type stopper of highly elastic and relatively soft material having a flat top area and a coaxially positioned bottom tapered portion, said tapered portion being adapted to enter the open end of said vial and provide a liquid and air-tight seal for the contents of said vial, and a pressure-sensitive material of strong adhesive qualities bonding the top of said rigid tubular cover in its interior to the flat top of said highly elastic stopper, said stopper being characterized by its ability at room temperature to stretch under low stress and to return rapidly to its original shape upon release of stress, said tapered portion having a centrally positioned hollow interior which is entirely open at its bottom to the interior of said vial when said cover with its integrally bonded stopper is seated in said vial, the outermost dimension of said tapered portion being approximately 13.9 mm., the diameter of the flat top area of said stopper being approximately 17.7 mm. and the medium diameter of said hollow interior being approximately 11.4 mm., the top of said highly elastic stopper being provided with an endless groove having a depth of approximately 0.4 mm., a width of 0.81 mm. and a diameter of approximately 14.3 mm.

9. A closure cap comprising a rigid cover part bonded by an adhesive to the top of a highly elastic soft plug-type stopper part for sealing the contents of a bottle, the top of said stopper being closed and having means for receiving any excess of said adhesive applied to one or more of the parts of said cap during the bonding operation.

10. A closure cap comprising a rigid cover securely bonded in its central interior portion by adhesive to the top of a highly elastic plug-type stopper for sealing the contents of a bottle, the top of said stopper being closed and having a notch therein located between the marginal area of the stopper and the center thereof, said notch serving to receive any excess of said adhesive applied during the bonding operation.

* * * * *

UNITED STATES PATENT AND TRADEMARK OFFICE
CERTIFICATE OF CORRECTION

PATENT NO. : 4,230,231
DATED : October 28, 1980
INVENTOR(S) : Robert R. Burnett; John W. Box It is certified that error appears in the above-identified patent and that said Letters Patent are hereby corrected as shown below:

Column 1, line 7, change "inventin" to --invention--; line 44, change "falls" to --fails--. Column 6, line 35, after "to", insert --a--; line 63, change "bial" to --vial--. Column 7, line 29, change "easily" to --equally--; line 48, before "neck", insert --open--.

Signed and Sealed this

Fourteenth Day of April 1981

[SEAL]

Attest:

RENE D. TEGTMEYER

Attesting Officer

Acting Commissioner of Patents and Trademarks